(12) United States Patent
Stevens et al.

(10) Patent No.: US 7,843,961 B2
(45) Date of Patent: Nov. 30, 2010

(54) HARDWARE DEVICE EMULATION

(75) Inventors: Jerry W. Stevens, Raleigh, NC (US);
Joel A. Fowler, Raleigh, NC (US);
Thomas P. McSweeney, Raleigh, NC (US); Mooheng Zee, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/188,440

(22) Filed: Jul. 25, 2005

(65) Prior Publication Data

US 2007/0019671 A1 Jan. 25, 2007

(51) Int. Cl.
*H04J 3/22* (2006.01)
*H04L 12/56* (2006.01)
*G06F 13/00* (2006.01)
*G06F 3/00* (2006.01)

(52) U.S. Cl. .................. 370/466; 370/401; 711/153; 719/321

(58) Field of Classification Search .................. 370/359, 370/401, 402, 419, 463, 466, 467; 709/215, 709/220, 230; 711/153, 202; 719/310, 315–316, 719/321, 327
See application file for complete search history.

(56) References Cited

U.S. PATENT DOCUMENTS

| | | | | |
|---|---|---|---|---|
| 3,641,505 | A * | 2/1972 | Artz et al. .................. 710/100 |
| 4,855,905 | A | 8/1989 | Estrada et al. | |
| 4,893,307 | A | 1/1990 | McKay et al. | |
| 5,958,013 | A | 9/1999 | King et al. | |
| 6,233,543 | B1 * | 5/2001 | Butts et al. .................. 703/27 |
| 6,289,388 | B1 | 9/2001 | Disney et al. | |
| 6,314,501 | B1 * | 11/2001 | Gulick et al. ............... 711/153 |
| 6,332,180 | B1 * | 12/2001 | Kauffman et al. ........... 711/153 |
| 6,438,671 | B1 * | 8/2002 | Doing et al. ................. 711/173 |
| 6,473,803 | B1 | 10/2002 | Stern et al. | |
| 6,510,496 | B1 * | 1/2003 | Tarui et al. ................... 711/147 |
| 6,574,588 | B1 * | 6/2003 | Shapiro et al. ................ 703/24 |
| 6,687,254 | B1 | 2/2004 | Ho et al. | |
| 6,728,764 | B1 * | 4/2004 | Wilson et al. ............... 709/220 |
| 6,859,439 | B1 * | 2/2005 | Driever et al. .............. 370/251 |
| 6,957,435 | B2 * | 10/2005 | Armstrong et al. .......... 718/104 |

(Continued)

FOREIGN PATENT DOCUMENTS

WO    01/95585 A1    12/2001

(Continued)

OTHER PUBLICATIONS

EP Office Action, Application No. 06 777 832.4-2413 Aug. 28, 2008, 8 pages.

*Primary Examiner*—Warner Wong
(74) *Attorney, Agent, or Firm*—Law Office of Jim Boice

(57) ABSTRACT

A solution for emulating a hardware device is provided. In particular, a communication device that includes a standard mode of operation and a mapping mode of operation is used together with a control program to emulate communication with the hardware device. The mapping mode of operation is used to implement communication functionality that requires hardware, while the control program emulates other communication functionality previously provided by the hardware device. As a result, a protocol, such as a channel protocol, that requires hardware functionality can be successfully emulated using both the control program and the communication device.

17 Claims, 4 Drawing Sheets

U.S. PATENT DOCUMENTS

| | | | |
|---|---|---|---|
| 6,988,174 B1* | 1/2006 | Yamashita | 711/153 |
| 7,051,180 B2* | 5/2006 | Downer et al. | 711/173 |
| 7,089,558 B2* | 8/2006 | Baskey et al. | 718/104 |
| 7,383,555 B2* | 6/2008 | Billau et al. | 719/327 |
| 7,386,688 B2* | 6/2008 | McMahan et al. | 711/153 |
| 7,389,398 B2* | 6/2008 | Garney | 711/173 |
| 7,395,400 B2* | 7/2008 | Mohideen et al. | 711/170 |
| 7,437,546 B2* | 10/2008 | Shamia et al. | 713/1 |
| 7,490,216 B1* | 2/2009 | Chen et al. | 711/206 |
| 2001/0030943 A1* | 10/2001 | Gregg et al. | 370/231 |
| 2002/0004835 A1* | 1/2002 | Yarbrough | 709/230 |
| 2002/0095521 A1* | 7/2002 | Blaukopf et al. | 709/310 |
| 2002/0124152 A1* | 9/2002 | Arndt et al. | 712/1 |
| 2002/0129127 A1* | 9/2002 | Romero et al. | 709/220 |
| 2003/0023666 A1* | 1/2003 | Conway et al. | 709/201 |
| 2003/0037178 A1* | 2/2003 | Vessey et al. | 709/319 |
| 2003/0135662 A1* | 7/2003 | Pett et al. | 709/321 |
| 2003/0167313 A1* | 9/2003 | Brown et al. | 709/215 |

FOREIGN PATENT DOCUMENTS

WO      0195585 A2      12/2001

* cited by examiner

HARDWARE DEVICE EMULATION

BACKGROUND OF THE INVENTION

1. Technical Field

The invention relates generally to emulating a hardware device, and more particularly, to a solution for replacing a hardware device with a combination of hardware and software.

2. Background Art

Frequently, as technology develops, an older hardware-based computing device (e.g., a legacy device) becomes outdated and is replaced by a new software-based computing solution. The new solution may provide increased flexibility, better performance, conform to modem standards/best practices, and/or the like. To this extent, the new solution will often reduce the overall cost of building and maintaining the computing infrastructure. In replacing the legacy device, it is desirable that existing software, such as one or more operating systems, that use the legacy device not require any modification. In particular, the new software-based solution should provide the same functionality and same communication interface to the existing software as that provided by the legacy device.

However, in some instances, all of the communication functionality provided by the legacy device cannot be replicated by software alone. For example, the 374x Communication Controller, a hardware control unit provided by International Business Machines Corp. of Armonk, N.Y. (IBM), provides support for enterprise systems connection (ESCON) channel connectivity using the channel data link control (CDLC) protocol for operating systems running on IBM's S/390 server platform. All of the communication functions provided by CDLC connectivity, such as hardware signaling (e.g., the creation of attention interrupts), cannot be achieved by software emulation alone. As a result, some combination of hardware and software will be required to provide the equivalent connectivity as that provided by the 374x Communication Controller.

To this extent, a need exists for a solution for emulating at least some of the communication functionality of a hardware device, such as a legacy hardware device, using a combination of hardware and software.

SUMMARY OF THE INVENTION

The invention provides a solution for emulating a hardware device. In particular, a communication device that includes a standard mode of operation and a mapping mode of operation is used together with a control program to emulate communication with the hardware device. The mapping mode of operation is used to implement communication functionality that requires hardware, while the control program emulates other communication functionality previously provided by the hardware device. As a result, a protocol, such as a channel protocol, that requires hardware functionality can be successfully emulated using both the control program and the communication device. For example, the hardware device can comprise the 374x Communication Controller offered by IBM, and communication with the Controller using the channel data link control (CDLC) protocol can be emulated.

A first aspect of the invention provides a method of emulating a hardware device, the method comprising: obtaining a communication device that includes a mapping mode of operation; obtaining a control program that communicates with the communication device over a first channel; and emulating communication with the hardware device over a second channel using the control program and the mapping mode of operation on the communication device.

A second aspect of the invention provides a communication device comprising: a system for implementing a standard mode of operation that receives a communication message over a network and forwards the communication message for processing by a corresponding logical partition; and a system for implementing a mapping mode of operation that includes: a module for receiving a channel message on a first channel in one of a first channel protocol or a second channel protocol; a module for mapping the channel message to the other of the first channel protocol or the second channel protocol; and a module for forwarding the mapped channel message over a second channel for processing.

A third aspect of the invention provides a computer program product stored on a computer readable medium, the computer program product comprising program code for enabling a computer to emulate a hardware device by performing the steps of: managing a channel connection on a communication device between a first channel for a first logical partition for the program product and a second channel for a second logical partition on the computer; and managing a communication session over a network for the second logical partition.

A fourth aspect of the invention provides a computer comprising: a communication device that includes at least one port comprising a standard mode of operation and a mapping mode of operation, wherein the mapping mode of operation maps a message received in one of a first channel protocol or a second channel protocol to the other of the first channel protocol or the second channel protocol; and a memory capable of including a plurality of logical partitions, the memory including: a first logical partition that communicates with the communication device over a first channel in the first channel protocol; and a second logical partition that communicates with the communication device over a second channel using the second channel protocol, wherein the second logical partition includes a control program that manages a communication session over a network for the first logical partition using the mapping mode of operation of the communication device.

A fifth aspect of the invention provides a method of generating a system for emulating communication with a hardware device, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a solution for emulating a hardware device. In particular, a communication device that includes a standard mode of operation and a mapping mode of operation is used together with a control program to emulate communication with the hardware device. The mapping mode of operation is used to implement communication functionality that requires hardware, while the control program emulates other communication functionality previously provided by the hardware device. As a result, a protocol, such as a channel protocol, that requires hardware functionality can be successfully emulated using both the control program and the communication device. For example, the hardware device can comprise the 374x Communication Controller offered by IBM, and communication with the Controller using the channel data link control (CDLC) protocol can be emulated.

Figure 1:
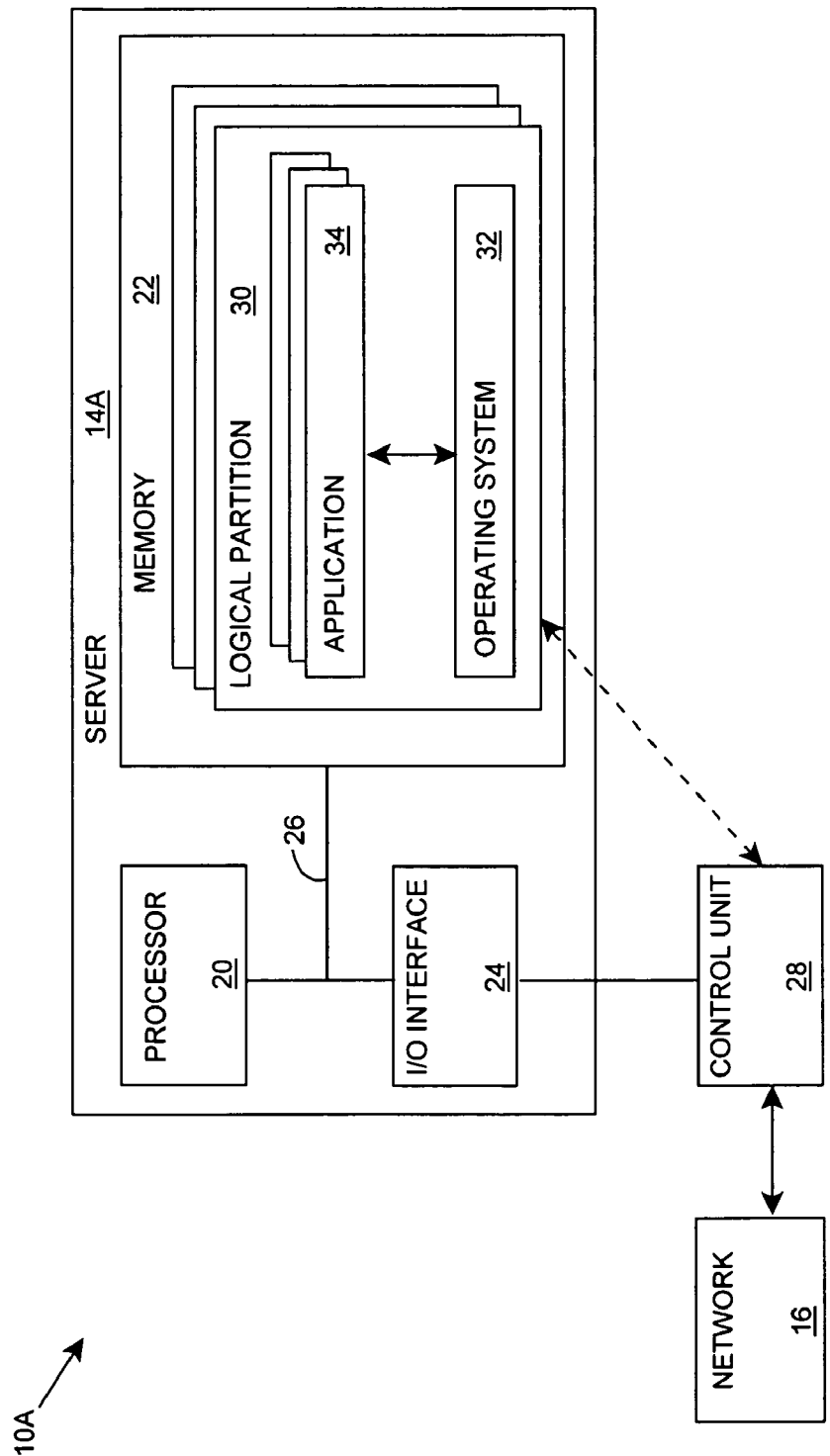
FIG. 1 shows an illustrative prior art computing environment.

In one embodiment, the invention is implemented as part of a solution for replacing a legacy hardware device with a combination of new hardware and software. To this extent, FIG. 1 shows an illustrative prior art computing environment 10A. In particular, environment 10A is shown including a server 14A that communicates over a network 16 via a control unit 28. Server 14A is shown including a processor 20, a memory 22, an input/output (I/O) interface 24, and a bus 26. As is known in the art, memory 22 is capable of including a plurality of logical partitions 30. Each logical partition 30 includes an operating system 32, which can be running one or more applications 34.

Control unit 28 manages one or more communication sessions over network 16 for one or more logical partitions 30. To this extent, control unit 28 can analyze and route messages received from a logical partition 30 and/or over network 16 to the correct destination. For example, control unit 28 can receive a message over network 16, identify a corresponding logical partition 30, and forward the message to the logical partition 30 for processing. Similarly, control unit 28 can receive a message from a logical partition 30 and forward the message for processing by another node on network 16. Network 16 can comprise any combination of one or more types of networks (e.g., the Internet, a wide area network, a local area network, a virtual private network, etc.). Further, communication over network 16 can utilize any combination of various wired/wireless transmission techniques and/or communication links.

Frequently, communication over network 16 are described with reference to a series of functional layers. For example, both the open system interconnection (OSI) model and systems network architecture (SNA) standards define seven layers. In both instances, the top-most layer addresses communication at the application 34 level, while the bottom-most layer defines the physical connections over which messages are sent. A communication session between two endpoints (e.g., application 34) is generally defined in the higher layers (e.g., layers three through seven in both the OSI model and SNA), and the connectivity for the communication session can be implemented using one or more communication protocols. A communication protocol defines a format for messages, specifies how endpoints are identified, and the like. For example, common communication protocols comprise the transmission control protocol (TCP), and the internet protocol (IP), which together are commonly used to enable communication over public and/or private networks 16.

On the lower layers, e.g., layer two of both the OSI model and SNA, connectivity can be provided over a channel using messages that are defined by a channel protocol. For example, in server 14A, a logical partition 30 can communicate with control unit 28 using a channel. In this case, messages are sent over the channel in a channel protocol, such as the channel data link control (CDLC) protocol, the queued direct input/output (QDIO) protocol, or the like.

In any event, control unit 28 can comprise a legacy hardware device to be replaced. For example, control unit 28 can comprise IBM's 374x Communication Controller, which has been designated for replacement by IBM. In replacing control unit 28, it is desirable to reduce and/or eliminate any required changes to logical partition 30, operating system 32, and/or application 34. However, as mentioned above, support for CDLC connectivity provided by the 374x Communication Controller cannot be emulated using software alone. As a result, some combination of hardware and software will be required to successfully replace the 374x Communication Controller without requiring changes to the operating systems 32 that use CDLC connectivity.

Figure 2:
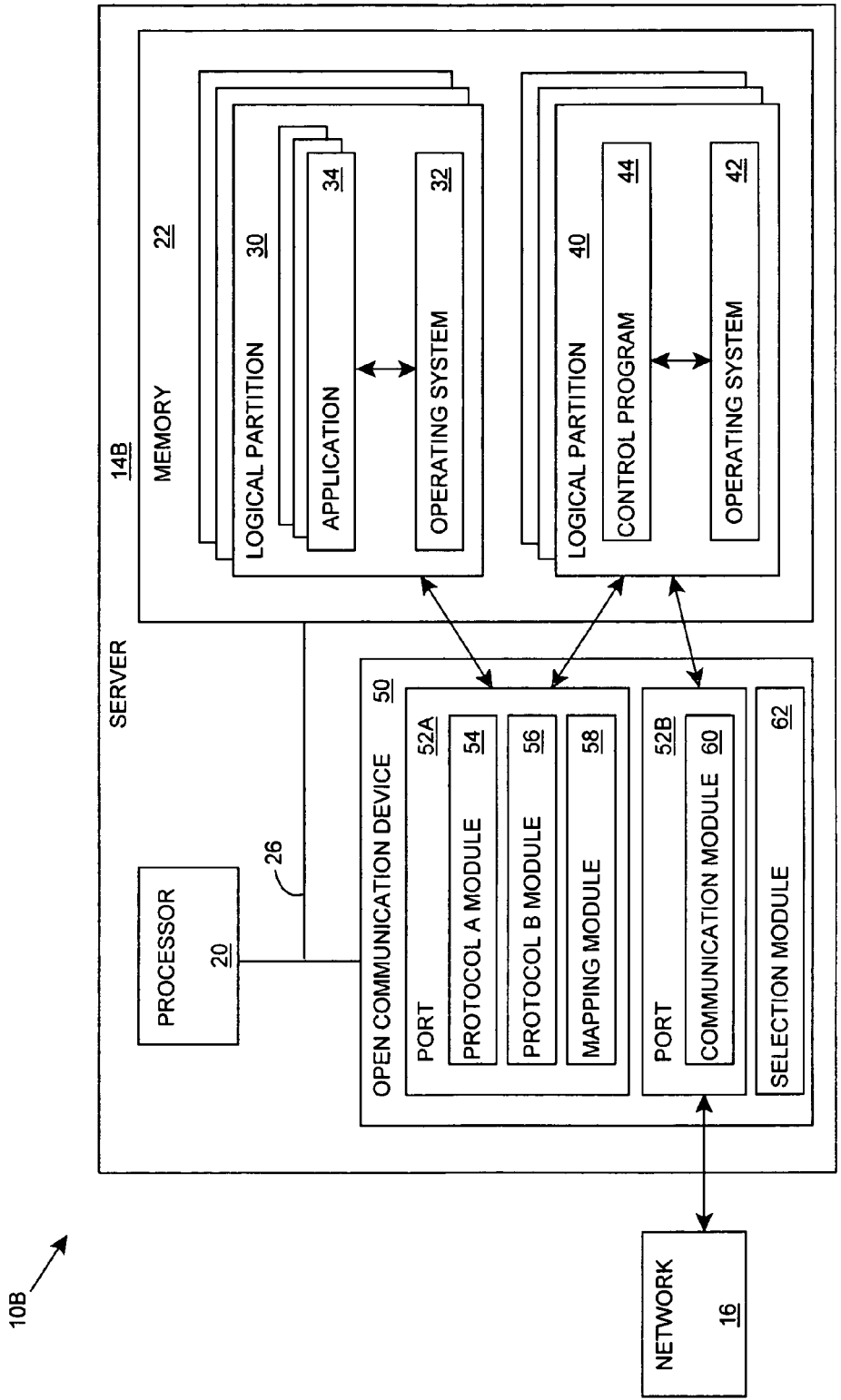
FIG. 2 shows an illustrative computing environment according to one embodiment of the invention.

FIG. 2 shows an illustrative computing environment 10B, in which the functionality provided by control unit 28 (FIG. 1) is replaced with a combination of hardware and software. In particular, open communication device 50 is obtained for server 14B. In particular, open communication device 50 can be manufactured, purchased, configured, or the like, and installed in server 14B. Open communication device 50 provides connectivity to network 16 for server 14B. It is understood that the term "open" means a communication device that can communicate with other communication devices using open standards. However, it is understood that open communication device 50 is only illustrative, and any communication device could be used. Further, while only a single processor 20 and open communication device 50 are shown, it is understood that server 14B can include a plurality of processors 20 and/or open communication devices 50. To this extent, it is understood that FIG. 2 is only a general representation of a server 14B. For example, server 14B can comprise a set (one or more) of processors that can be used by logical partitions 30, 40 and not open communication device(s) 50, and another set of processors that can be used by open communication device(s) 50 and not logical partitions 30, 40.

In one embodiment, open communication device 50 comprises an open systems adapter (OSA)-Express card offered by IBM. In this case, open communication device 50 can comprise two ports 52A-B. Alternatively, open communication device 50 can comprise a single port, or one or more additional ports 52A-B. Regardless, each port 52A-B in open communication device 50 can comprise a communication module 60 for implementing a standard mode of operation. In the standard mode of operation, a port, such as port 52B, can receive a communication message from a logical partition, such as logical partition 40, and communication module 60 can forward the communication message over network 16 for processing by another node. Additionally, port 52B can receive a communication message from network 16 and communication module 60 can forward the communication message to a corresponding logical partition 40 for processing. To this extent, communication module 60 can maintain routing information to determine the correct logical partition 40 to which the communication message should be forwarded.

While open communication device 50 and ports 52A-B provide the connection to network 16 that was previously provided by the legacy hardware control unit 28 (FIG. 1), a control program 44 is obtained for server 14B to provide the management functions of control unit 28. In particular, control program 44 can be created, purchased, and/or the like, and installed on server 14B. In general, control program 44 manages communication session(s) over network 16 for one or more applications 34/operating systems 32 in one or more logical partitions 30. In order to execute control program 44, server 14B creates a logical partition 40 that includes an operating system 42 that is capable of executing control program 44. While executing, control program 44 manages a communication session over network 16 for an operating system 32 in another logical partition 30. In one embodiment, operating system 42 comprises an open source operating system, such as Linux. Additionally, server 14B can create a plurality of logical partitions 40 each of which includes a control program 44 for managing communication session(s) for other partition(s) 30.

However, in order to emulate some communication functionality of control unit 28 (FIG. 1), a combination of hardware and software may be required. For example, a port, such as port 52A, can provide the required hardware communication functionality while control program 44 implements the remainder of the communication functionality. In addition, port 52A can be used to route communication between logical partition 30, which is communicating in a communication session over network 16 and requires the hardware communication functionality, and logical partition 40, which includes the control program 44 that is managing the communication session for logical partition 30. Subsequently, control program 44 can use a second port, such as port 52B, in the standard mode of operation to provide the communication link to network 16. It is understood, that while ports 52A-B are shown on the same open communication device 50, two ports 52A-B on different open communication devices 50 could be used.

In order to implement the alternative functionality, one or more ports 52A-B in open communication device 50 can comprise a system that includes one or more modules for implementing a mapping mode of operation. To this extent, open communication device 50 can further include a selection module 62 that enables selection of either the standard or mapping mode of operation for ports 52A-B. Selection module 62 can comprise any known solution for configuring the operation of a port 52A-B. For example, selection module 62 can comprise one or more hardware (e.g., a switch, jumper, or the like) and/or software (e.g., a data value) settings that define how to configure the operation of port(s) 52A-B when open communication device 50 is initialized.

The mapping mode of operation of port 52A is used to emulate one or more communication functions of control unit 28 (FIG. 1). For example, the mapping mode can be used to emulate communication with control unit 28 using a channel protocol that includes communication functionality that requires hardware. In one embodiment, server 14B comprises IBM's S/390 server and control unit 28 comprises IBM's 374x Communication Controller. In this case, it is desirable to continue to enable several operating systems 32, such as z/OS, that run on the S/390 server 14B to use the channel data link control (CDLC) protocol, which requires communication functionality, such as the creation of attention interrupts, that can only be implemented in hardware.

Further, operating system 42 may use a different channel protocol to communicate with ports 52A-B, such as the queued direct input output (QDIO) protocol to communicate with open communication device 50. In this case, in order to implement the mapping mode of operation, a port, such as port 52A, can include a protocol A module 54 for managing channel messages in a first channel protocol, a protocol B module 56 for managing channel messages in a second channel protocol, and a mapping module 58 for mapping a channel message from one of the first or second channel protocol to the other of the first or second channel protocol. As a result, the mapping mode of open communication device 50 can be used to map channel messages between the CDLC protocol and the QDIO protocol, thereby enabling emulation of communication with IBM's 374x Communication Controller 28 using the CDLC protocol without requiring control program 44 to have any knowledge of the CDLC protocol.

Figure 3:
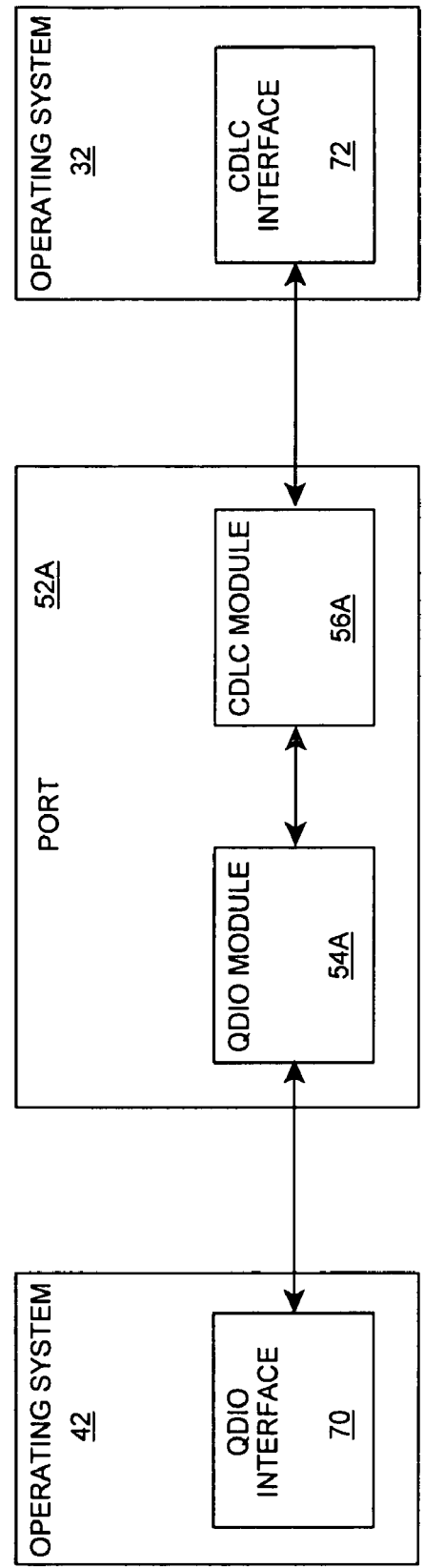
FIG. 3 shows an overview of an illustrative dataflow for mapping two protocols.

To this extent, FIG. 3 shows an overview of an illustrative dataflow for mapping the two illustrative channel protocols, CDLC and QDIO. In general, operating system 42 and operating system 32 each communicate with port 52A using a unique channel. In particular, operating system 42 can comprise a QDIO interface 70 that implements communication with port 52A over a channel using the QDIO protocol. Additionally, port 52A includes a QDIO (protocol A) module 54A that receives and forwards channel messages in the QDIO protocol between port 52A and operating system 42. Similarly, operating system 32 includes a CDLC interface 72 that implements communication with port 52A over a channel using the CDLC protocol. Further, port 52A includes a CDLC (protocol B) module 56A that receives and forwards channel messages in the CDLC protocol between port 52A and operating system 32.

Returning to FIG. 2, after receiving a channel message from a logical partition 30, 40, protocol A module 54 or protocol B module 56 can perform any necessary communication functionality. Further, the corresponding module 54, 56 can provide the channel message for processing by mapping module 58. Mapping module 58 locates the corresponding logical partition 30, 40, and, if necessary, maps the channel message from one channel protocol to the other channel protocol. Subsequently, mapping module 58 provides the mapped channel message to the other protocol module 54, 56 for forwarding to the appropriate logical partition 30, 40.

Mapping module 58 can map the messages from one protocol to another using any appropriate solution. To this extent, mapping module 58 can replace a message header for one channel protocol with a corresponding message header for the other channel protocol. For example, the QDIO protocol comprises a thirty-two byte header that can be generated when generating a QDIO message based on a message in another channel protocol or removed when generating a message in another channel protocol based on a QDIO message.

In order to implement communication between logical partition 30 and logical partition 40, the mapping module 58 can use a set (one or more) of channel connections. Each channel connection can define a communication path between two logical partitions 30, 40. For example, a channel connection can identify a first channel used by a first logical partition 30 and a second channel used by a second logical partition 40. To this extent, one logical partition 40 will include the control program 44, while the other logical partition 30 will include the operating system 32 for which communication with control unit 28 (FIG. 1) is being emulated. Further, each channel connection can include additional communication data that is required to implement the communication path, such as a corresponding channel protocol for each channel.

Figure 4:
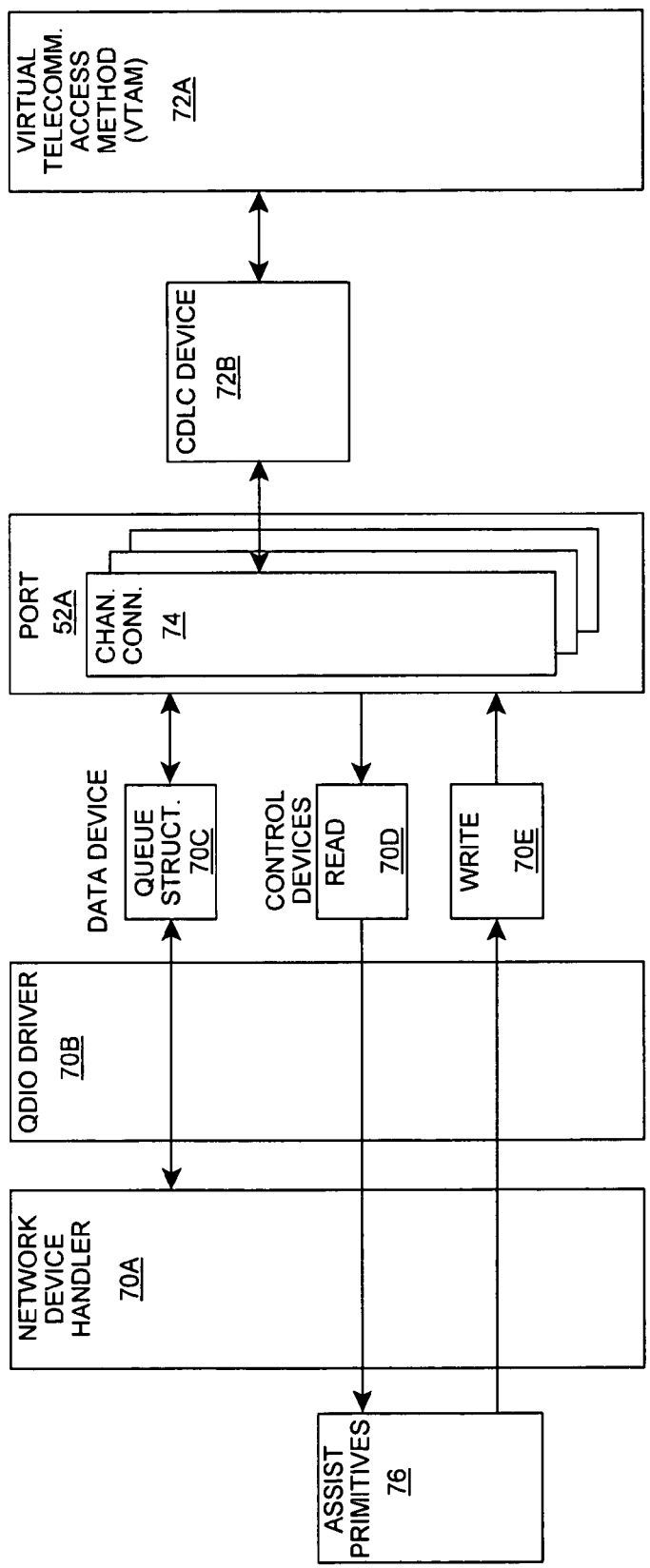
FIG. 4 shows an illustrative data flow diagram between various systems according to one embodiment of the invention.

In one embodiment, control program 44 manages the set of channel connections on port 52A. To this extent, FIG. 4 shows an illustrative data flow diagram between various systems according to one embodiment of the invention. In particular, FIG. 4 comprises an illustrative lower level view of the data flow diagram of FIG. 3. As such, the QDIO interface 70 (FIG. 3) is shown comprising a network device handler 70A that provides an interface between control program 44 (FIG. 2) and a QDIO driver 70B. As defined by the QDIO architecture, the connection to port 52A is implemented using three devices, a data device comprising a queue structure 70C, and two control devices, a read device 70D and a write device 70E. In the QDIO architecture, control messages flow over control devices 70D-E, while user data flows over the data device using the queue structure 70C.

Further, the QDIO architecture defines a special set of control messages called assist primitives 76. An assist primitive 76 comprises a command that enables a device, such as port 52A, to assist with software functions. In one embodiment, a set (one or more) of assist primitives 76 are defined that enable control program 44 (FIG. 2) to manage a set of channel connections 74 on port 52A. For example, control program 44 can generate and send to port 52A an assist primitive 76 that includes a management operation (e.g., register, de-register, modify, etc.) for one of the set of channel connections 74. Once received, QDIO module 54A (FIG. 3) can process the assist primitive. In particular, QDIO module 54A can perform the requested management operation and generate a response, if necessary, that is communicated back to control program 44.

To this extent, control program 44 (FIG. 2) can read a configuration file or the like to determine the existence of one or more logical partitions 30 (FIG. 2). Subsequently, control program 44 can generate and send to port 52A one or more assist primitives 76 to request the establishment of a connection with each logical partition 30. In response, QDIO module 54A (FIG. 3) can determine if a connection is available. If so, QDIO module 54A can generate a new channel connection 74. If not, QDIO module 54A can indicate that no connection is available. In any event, it is understood that assist primitives 76 are processed by QDIO module 54A, and are not forwarded along any communication path to another logical partition. Further, QDIO module 54A can use one or more assist primitives 76 to send data to control program 44 for processing. For example, a channel event may occur for a channel included in a channel connection 74 being managed by control program 44. In this case, QDIO module 54A can provide data on the channel event to control program 44 using an assist primitive.

Each channel connection 74 defines a communication path to another logical partition 30 (FIG. 2). To this extent, as discussed above, logical partition 30 can be using another channel protocol, such as the CDLC protocol, which is implemented using a CDLC interface 72 (FIG. 3). As shown, CDLC interface 72 can include a system, such as a virtual telecommunications access method (VTAM) 72A, that implements the SNA communication protocol. In this case, the communication stack provides an SNA CDLC driver that interfaces with port 52A using a single CDLC device 72B for both reading and writing as defined by the CDLC protocol. Further, traditional channel programs and channel commands unique to the CDLC protocol are used in communicating with port 52A. After receiving a command, CDLC module 56A (FIG. 3) can implement any necessary hardware functionality, and forward the command for processing by mapping module 58 (FIG. 2) as discussed herein. It is understood that VTAM 72A is only illustrative of various systems, including a transaction processing facility (TPF), that implement the SNA communication protocol.

Returning to FIG. 2, while both open communication device 50 and control program 52 are required to emulate communication with control unit 28 (FIG. 1), it is understood that each can be provided apart from the other. For example, open communication device 50 can be installed in server 14B and each port 52A-B can operate in standard mode to provide connectivity to network 16. Similarly, control program 44 can be separately obtained and installed in server 14B to provide the management of communication session(s) over network 16 with or without the use of the mapping mode of operation for one or more ports 52A-B. Further, while discussed as replacing control unit 28, it is understood that port 52A-B and control program 44 could be temporarily used to test and/or debug an interface between logical partition 30 and control unit 28. Regardless, it is understood that various additional applications are possible as will be recognized by one in the art.

In another embodiment, the invention provides a method of generating a system for emulating a hardware device. In this case, a server, such as server 14B (FIG. 2), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on server 14B from a computer-readable medium; (2) adding one or more devices, such as open communication device 50, to server 14B; and (3) incorporating and/or modifying one or more existing systems of server 14B, to enable server 14B to perform the process steps of the invention.

It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) (e.g., a fixed disk, a read-only memory, a random access memory, a cache memory, etc.), and/or as a data signal traveling over a network (e.g., during a wired/wireless electronic distribution of the program code).

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Similarly, as used herein the terms "system" and "module" are synonymous and mean any set of components (software and/or hardware) for performing a particular function.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method comprising:
   managing a channel connection on a communication device, the channel connection defining a communication path between a first channel for a first logical partition in a computer and a second channel for a second logical partition, distinct from the first logical partition, in the computer, wherein the communication device comprises hardware configured to provide connectivity to an external network for the computer;

emulating communication between the first logical partition and the hardware device, without use of the hardware device, using the communication device, said emulating comprising communicating messages between the first logical partition and the second logical partition using the channel connection, wherein the messages comprise at least one of: a message emulating a message generated by the hardware device for processing by the operating system or a message generated by the operating system addressed to the hardware device; and managing a communication session over the network for the first logical partition using the second logical partition.

2. The method of claim 1, said emulating further comprising managing a channel connection by defining a communication path between a first channel for the first logical partition and a second channel for the second logical partition.

3. The method of claim 2, said communicating further comprising:

receiving a message in one of a first channel protocol or a second channel protocol distinct from the first channel protocol over a corresponding one of the first channel or the second channel;

mapping the received message to the other of the first channel protocol or the second channel protocol; and forwarding the mapped message over the other of the first channel or the second channel using the channel connection.

4. The method of claim 1, said method further comprising managing a communication session over the network for the operating system using a control program.

5. A communication device comprising:

a plurality of ports, each port comprising hardware configured to provide connectivity to an external network for a computer and comprising a system configured to implement a standard mode of operation that transmits and receives packets of data between a corresponding logical partition in the computer and a node on the network; and a memory including a plurality of logical partitions, the memory comprising:

a first logical partition communicating with the communication device over a first channel in a first channel protocol for a hardware device; and a second logical partition communicating with the communication device over a second channel using a second channel protocol distinct from the first channel protocol, wherein the second logical partition comprises a control program managing a communication session over the network for the first logical partition using a mapping mode of operation of the communication device; and a system in at least one of the plurality of ports configured to implement the mapping mode of operation to emulate communication between said first logical partition and said hardware device, without use of the hardware device, by communicating messages between the first logical partition and a second logical partition. distinct from the first logical partition, using said at least one of the plurality of ports operating in the mapping mode of operation.

6. The communication device of claim 5, wherein the system configured to implement the mapping mode of operation comprises a module configured to manage a channel connection defining a communication path between a first channel for the first logical partition and a second channel for the second logical partition.

7. The communication device of claim 6, wherein the system configured to implement the mapping mode of operation further comprises:

a module configured to receive a message in one of a first channel protocol or a second channel protocol distinct from the first channel protocol over a corresponding one of the first channel or the second channel;

a module configured to map the received message to the other of the first channel protocol or the second channel protocol; and a module configured to forward the mapped message over the other of the first channel or the second channel using the channel connection.

8. The communication device of claim 6, wherein the system configured to implement the mapping mode of operation further comprises a module configured to process a management operation for the channel connection.

9. The communication device of claim 5, wherein the system configured to implement the mapping mode of operation comprises a module configured to manage a communication session over the network for the operating system using the control program.

10. A non-transitory computer program product stored on a computer readable storage medium, the computer program product comprising program code for enabling a computer to implement a method comprising:

managing a channel connection on a communication device, the channel connection defining a communication path between a first channel for a first logical partition in the computer and a second channel for a second logical partition, distinct from the first logical partition, in the computer, wherein the communication device includes hardware configured to provide connectivity to an external network for the computer;

emulating communication between the first logical partition and the hardware device, without use of the hardware device, using the communication device, the emulating including communicating messages between the first logical partition and the second logical partition using the channel connection, wherein the messages include at least one of: a message emulating a message generated by the hardware device for processing by the operating system or a message generated by the operating system addressed to the hardware device; and managing a communication session over the network for the first logical partition using the second logical partition.

11. The program product of claim 10, the communicating messages including:

receiving a message in one of a first channel protocol or a second channel protocol distinct from the first channel protocol over a corresponding one of the first channel or the second channel;

mapping the received message to the other of the first channel protocol or the second channel protocol; and forwarding the mapped message over the other of the first channel or the second channel using the channel connection.

12. The program product of claim 11, wherein the first channel protocol comprises the queued direct input output (QDIO) protocol.

13. The method of claim 12, wherein the managing a channel connection uses a set of assist primitives.

14. A computer comprising:

a communication device including:

a plurality of ports, each port comprising hardware configured to provide connectivity to an external network for the computer and including a system configured to implement a standard mode of operation that transmits and receives packets of data between a corresponding logical partition in the computer and a node on the network; and at least one of the plurality of ports further including a system configured to implement a mapping mode of operation to emulate communication between a first logical partition and a hardware device, without use of the hardware device, by communicating messages between the first logical partition and a second logical partition, distinct from the first logical partition, using the at least one of the plurality of ports operating in the mapping mode of operation; and a memory including a plurality of logical partitions, the memory including:

a first logical partition communicating with the communication device over a first channel in a first channel protocol for the hardware device; and a second logical partition communicating with the communication device over a second channel using a second channel protocol distinct from the first channel protocol, wherein the second logical partition includes a control program managing a communication session over the network for the first logical partition using the mapping mode of operation of the communication device.

15. The computer of claim 14, further comprising a system configured to select one of the standard mode of operation or the mapping mode of operation for each of the at least one ports.

16. The computer of claim 14, wherein the system configured to implement the mapping mode of operation includes a module configured to manage a channel connection defining a communication path between a first channel for the first logical partition and a second channel for the second logical partition.

17. The computer of claim 16, wherein the control program manages the channel connection.

* * * * *